(12) United States Patent  (10) Patent No.: US 7,411,849 B2
Wild  (45) Date of Patent: Aug. 12, 2008

(54) APPARATUS AND METHOD FOR TRANSFERRING AN ANALOG SIGNAL BETWEEN ISOLATED SYSTEMS

(75) Inventor: Arthur Wild, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 371 days.

(21) Appl. No.: 11/346,473

(22) Filed: Feb. 2, 2006

(65) Prior Publication Data

US 2007/0177311 A1 Aug. 2, 2007

(51) Int. Cl.
*G11C 7/00* (2006.01)
(52) U.S. Cl. .................................. 365/204; 365/149
(58) Field of Classification Search ................ 365/204, 365/149
See application file for complete search history.

(56) References Cited

U.S. PATENT DOCUMENTS

| | | | |
|---|---|---|---|
| 5,499,176 A | 3/1996 | Erisman | |
| 5,864,457 A | 1/1999 | Kates et al. | |
| 6,043,703 A | 3/2000 | Bavol | |
| 6,404,609 B1 | 6/2002 | Mansfield et al. | |
| 6,430,229 B1 | 8/2002 | Scott et al. | |
| 2004/0165669 A1* | 8/2004 | Otsuka et al. | 375/257 |

FOREIGN PATENT DOCUMENTS

FR 2685582 6/1993

OTHER PUBLICATIONS

US 5,838,018, 11/1998, Mansfield (withdrawn)

* cited by examiner

*Primary Examiner*—Son Dinh
(74) *Attorney, Agent, or Firm*—Steve Lundquist

(57) ABSTRACT

An apparatus and method for transferring a signal from a first bus circuit to a second bus circuit. The apparatus and method includes a first constant current circuit connected to the first bus circuit, a first capacitor connected between the first bus circuit and the first constant current circuit, a second constant current circuit connected to the second bus circuit, a second capacitor connected between the second bus circuit and the second constant current circuit, and an opto-coupler connected between the first and second constant current circuits and providing signal transfer control from the first capacitor to the second capacitor.

21 Claims, 5 Drawing Sheets

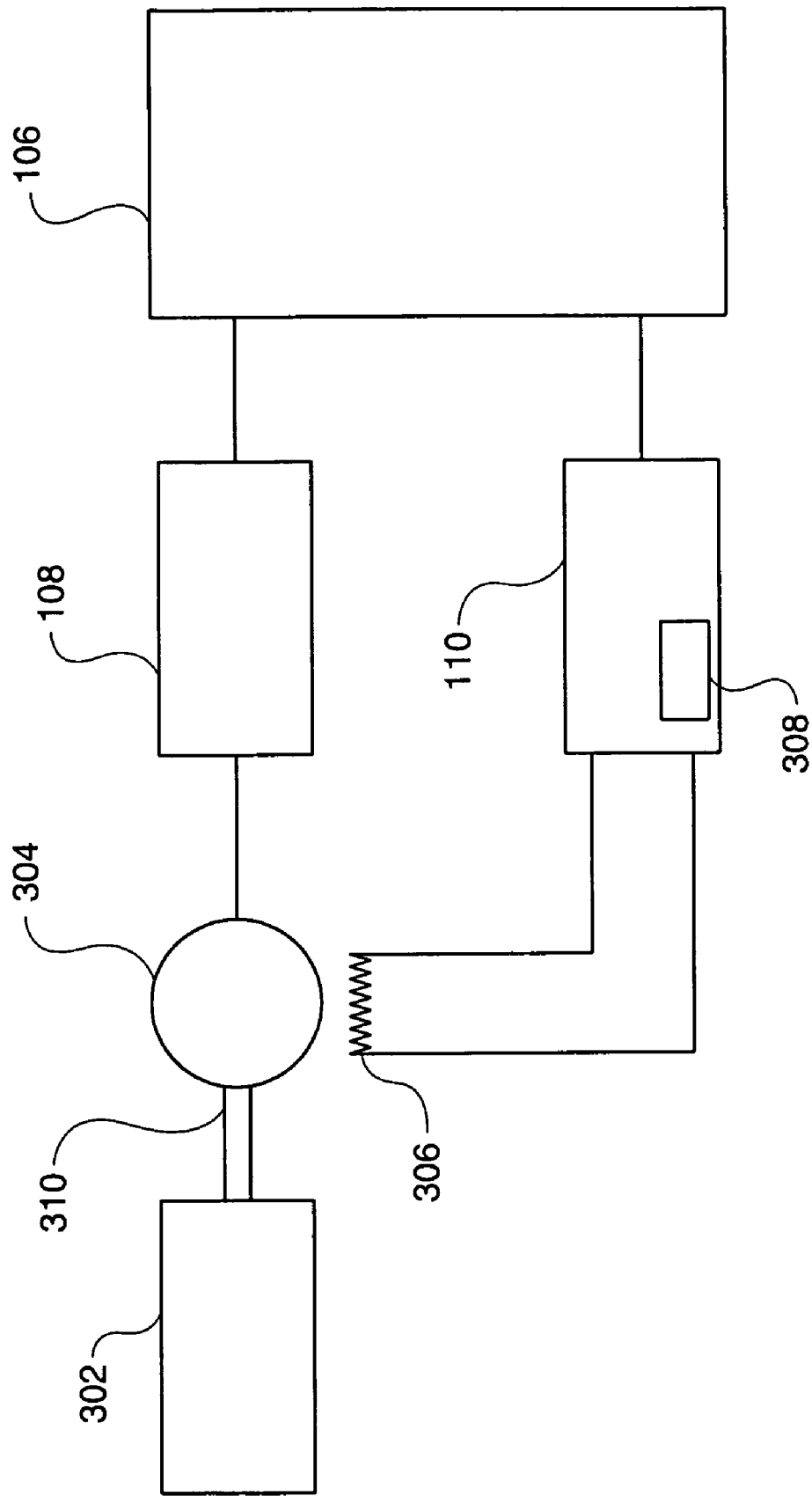

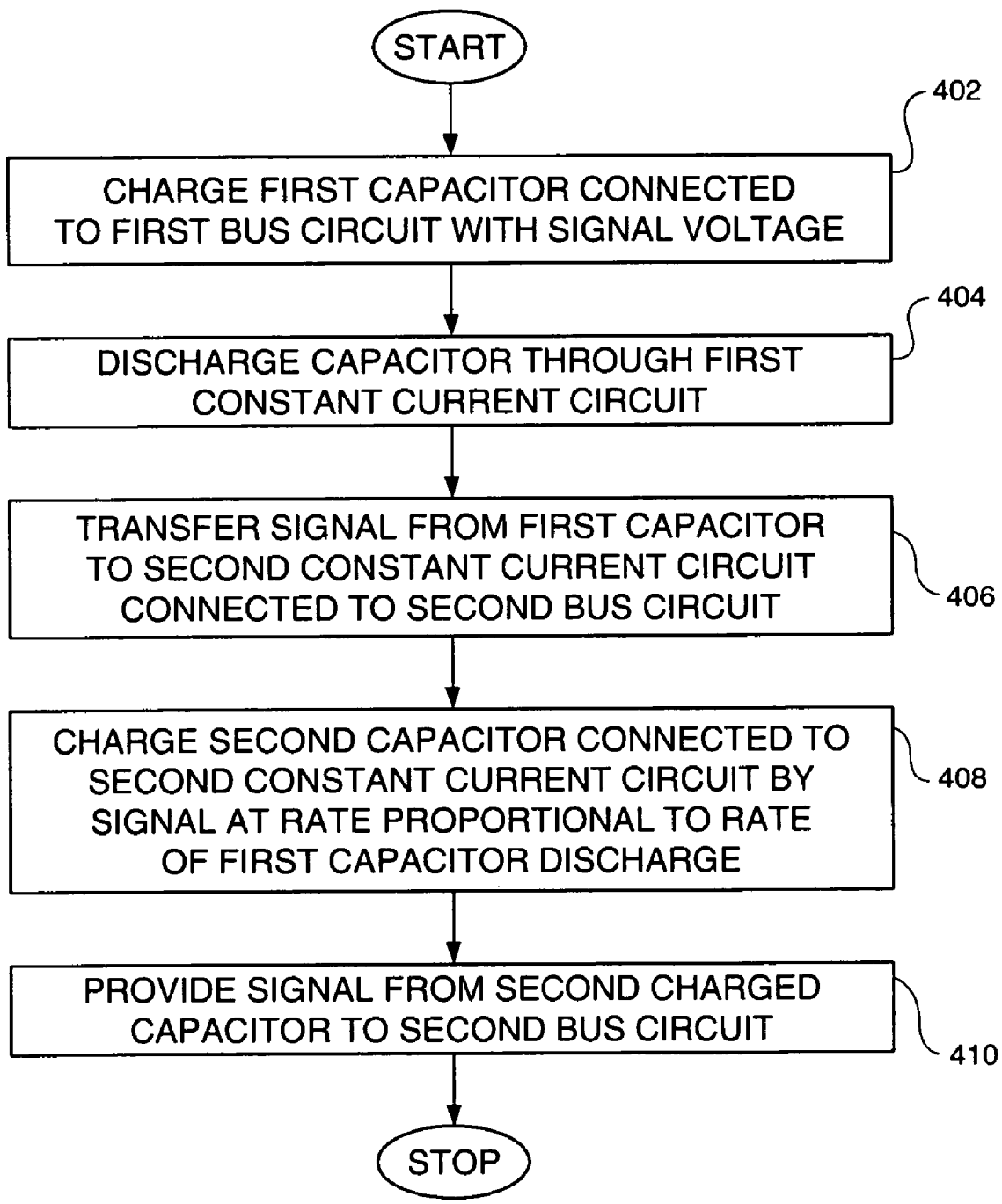

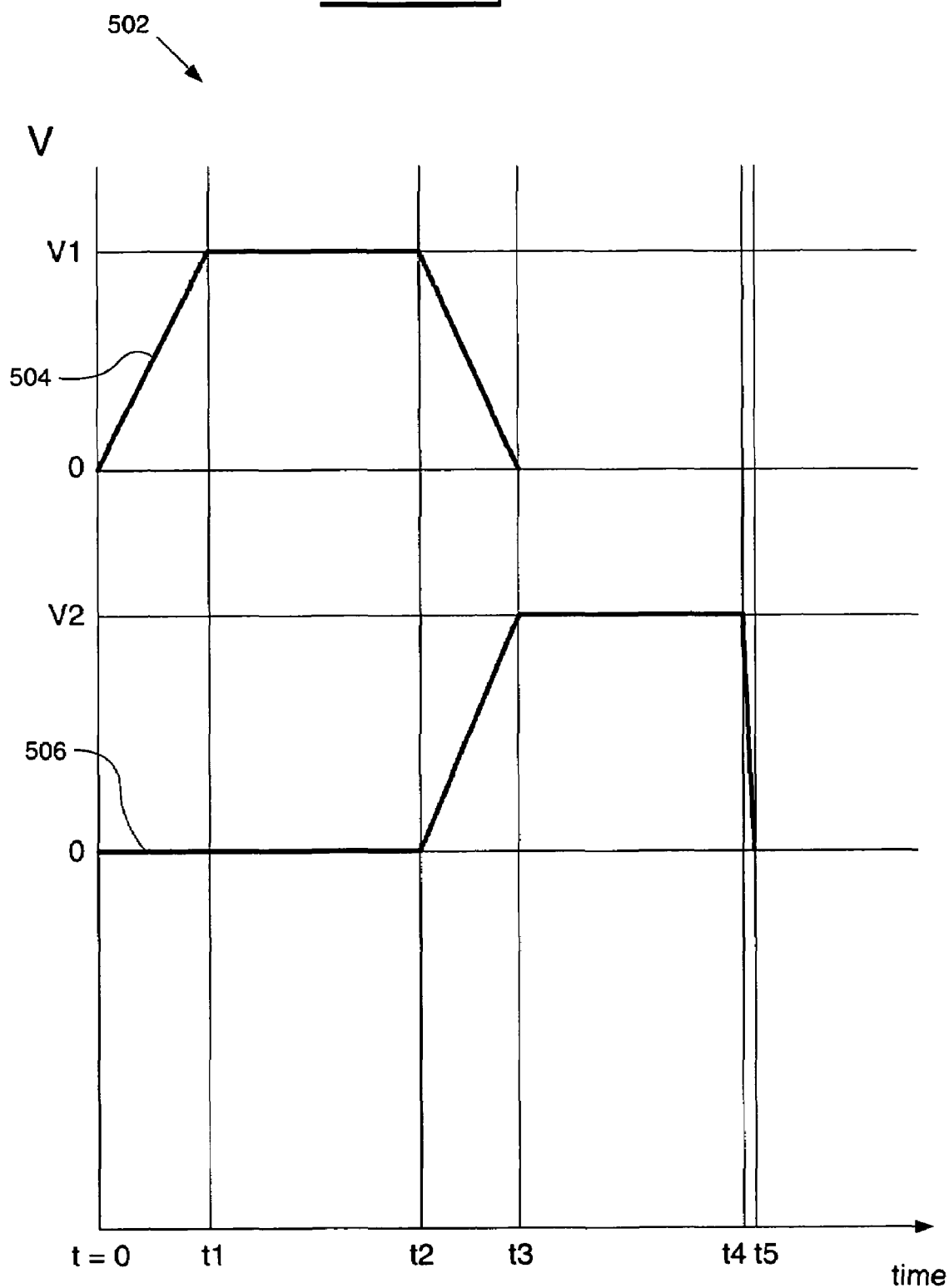

APPARATUS AND METHOD FOR TRANSFERRING AN ANALOG SIGNAL BETWEEN ISOLATED SYSTEMS

TECHNICAL FIELD

This invention relates generally to an apparatus and method for transferring signals between systems and, more particularly, to an apparatus and method for transferring an analog signal from a first bus to a second bus isolated from the first bus.

BACKGROUND

It is often desired to transmit information from one circuit to another in situations in which the two circuits must also be electrically isolated from each other. For example, a high voltage circuit may be operating in proximity with a low voltage circuit, and transfer of data may be desired from the high voltage circuit to the low voltage circuit. However, transfer of data must take place without compromising the isolation between the two circuits to prevent high voltages from being present on the low voltage side.

One example of the above situation may occur in machines or vehicles that employ one voltage bus, such as a high voltage DC bus, for purposes such as electric drive motors and the like. A second, low voltage DC bus, may also be found in the machine or vehicle for providing a low DC voltage to various accessories, such as lights and electronic control modules (ECMs). It is desired that the high voltage never be present on the low voltage side, yet some technique may be needed to deliver signals, such as analog data signals, from the high voltage bus to the low voltage bus, while maintaining isolation of the two voltages.

Past methods to accomplish this include such ideas as isolation amplifiers, linear opto-couplers, signal chopping and delivery via transformers, and the like. These methods, however, tend to be costly and are more suited for special purpose applications, such as high speed data transmission. For situations in which low speeds of data transmission are suitable, such as low speed analog data transmission, lower cost alternatives are needed that still provide efficient and reliable operation.

In U.S. Pat. No. 6,430,229, Scott et al. provide a system in which capacitive coupling of two isolated circuits is used. A pair of capacitors is connected directly between the two circuits. The use of capacitors for direct coupling, however, requires much additional circuitry, such as a diode bridge power supply, an encoder, a decoder, a driver, a clock recovery circuit, and more, to prepare data for transmittal and receipt. This additional circuitry adds much to the cost, and also introduces much potential for breakdown and failure. Furthermore, the use of capacitors to directly connect two isolated circuits does not provide true electrical isolation, and may fail to isolate should one or both capacitors fail.

U.S. Pat. No. 6,404,609, to Mansfield et al., offers simplified circuitry, and also provides true electrical isolation by way of an opto-coupler. The circuit, however, is configured to work with transmittal of digital signals and is not suited for analog signal transmissions.

The present invention is directed to overcoming one or more of the problems as set forth above.

SUMMARY OF THE INVENTION

In one aspect of the present invention an apparatus for transferring a signal from a first bus circuit to a second bus circuit is disclosed. The apparatus includes a first constant current circuit connected to the first bus circuit, a first capacitor connected between the first bus circuit and the first constant current circuit, a second constant current circuit connected to the second bus circuit, a second capacitor connected between the second bus circuit and the second constant current circuit, and an opto-coupler connected between the first and second constant current circuits and providing signal transfer control from the first capacitor to the second capacitor.

In another aspect of the present invention a method for transferring a signal from a first bus circuit to a second bus circuit is disclosed. The method includes the steps of charging a first capacitor connected to the first bus circuit with a signal voltage, enabling a first constant current circuit, connected to the first capacitor, to discharge the first capacitor through the first constant current circuit, activating an opto-coupler connected between the first and second bus circuits to initiate charging of a second capacitor connected to a second constant current circuit, and charging the second capacitor at a rate proportional to a rate of discharge of the first capacitor.

BRIEF DESCRIPTION OF THE DRAWINGS

FIG. 3 is a block diagram illustrating an application of the present invention;

FIG. 4 is a flow diagram illustrating a method of the present invention; and

FIG. 5 is a graph depicting voltage levels.

DETAILED DESCRIPTION

Figure 1:
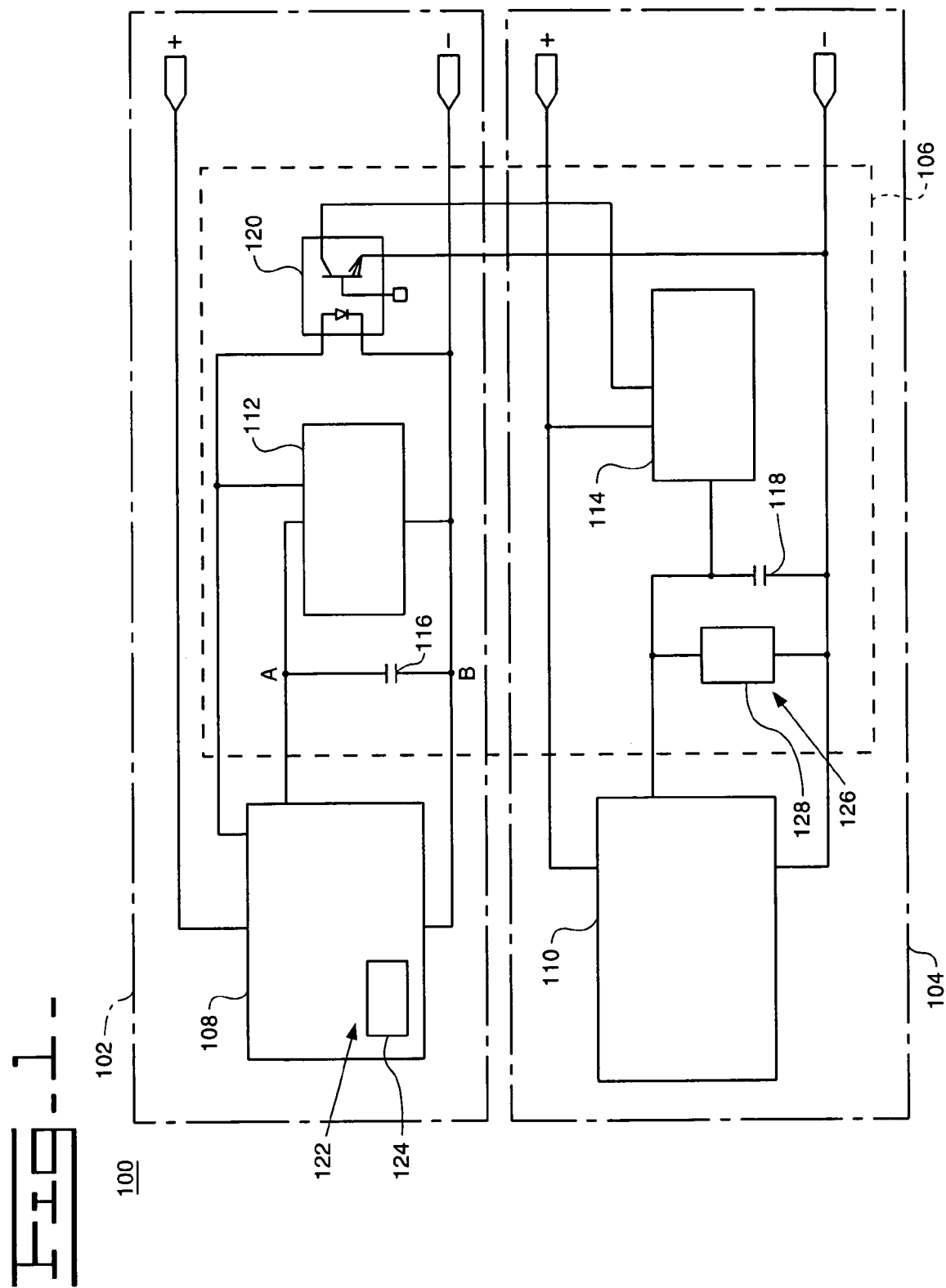
FIG. 1 is a block diagram illustrating an aspect of the present invention.

Referring to the drawings, and with particular reference to FIG. 1, an apparatus 100 for transferring an analog signal between isolated systems is shown. The isolated systems may include two or more systems that are electrically isolated from each other. For example, it may be desired to isolated a high voltage system from a low voltage system, yet have the capability to transfer signals from one system to the other without compromising the integrity of the isolation.

FIG. 1 indicates a first electrical system characterized as a first bus 102, and a second electrical system as a second bus 104. For exemplary purposes, the first bus 102 may be a high voltage bus, and the second bus 104 may be a low voltage bus. One possible application may be a machine having an electric drive. The first bus 102 could provide a high voltage to drive components, and the second bus 104 a low voltage for electrical accessories. Such applications for electric drive machines are well known in the art.

Although the present disclosure describes the exemplary arrangement of isolated high and low voltage systems, the apparatus 100, as described and claimed, is suited for many types of systems in which electrical isolation is needed, and transfer of analog signals between the systems is desired.

The first bus 102 includes a first bus circuit 108, having electrical components to utilize the bus voltage for desired purposes. In like manner, the second bus 104 includes a second bus circuit 110. A signal transfer system 106, interconnected between the first and second bus circuits 108, 110, provides a path for signal transfer while maintaining electrical isolation.

The signal transfer system 106 includes a first constant current circuit 112 connected to the first bus circuit 108, and a second constant current circuit 114 connected to the second bus circuit 110. A first capacitor 116 is connected between the first bus circuit 108 and the first constant current circuit 112. A second capacitor 118 is connected between the second bus circuit 110 and the second constant current circuit 114. An opto-coupler 120 is connected between the first and second constant current circuits 112,114, and provides signal transfer control from the first capacitor 116 to the second capacitor 118, as described below. The opto-coupler 120 may be a low-cost non-linear opto-coupler, such as used for on-off applications, thus avoiding the higher cost of linear opto-couplers.

A signal transfer enabler 122 may be located in the first bus circuit 108. The signal transfer enabler 122, such as a processor 124, may controllably enable the first constant current circuit 112, i.e., initiate current flow, to begin a transfer of a signal, such as a DC voltage. Prior to signal transfer, however, a signal reset circuit 126, such as a switch 128 located across the second capacitor 118, may reset the receiving portion of the signal transfer system 106 by shunting any residual voltage on the second capacitor 118 to ground.

Figure 2:
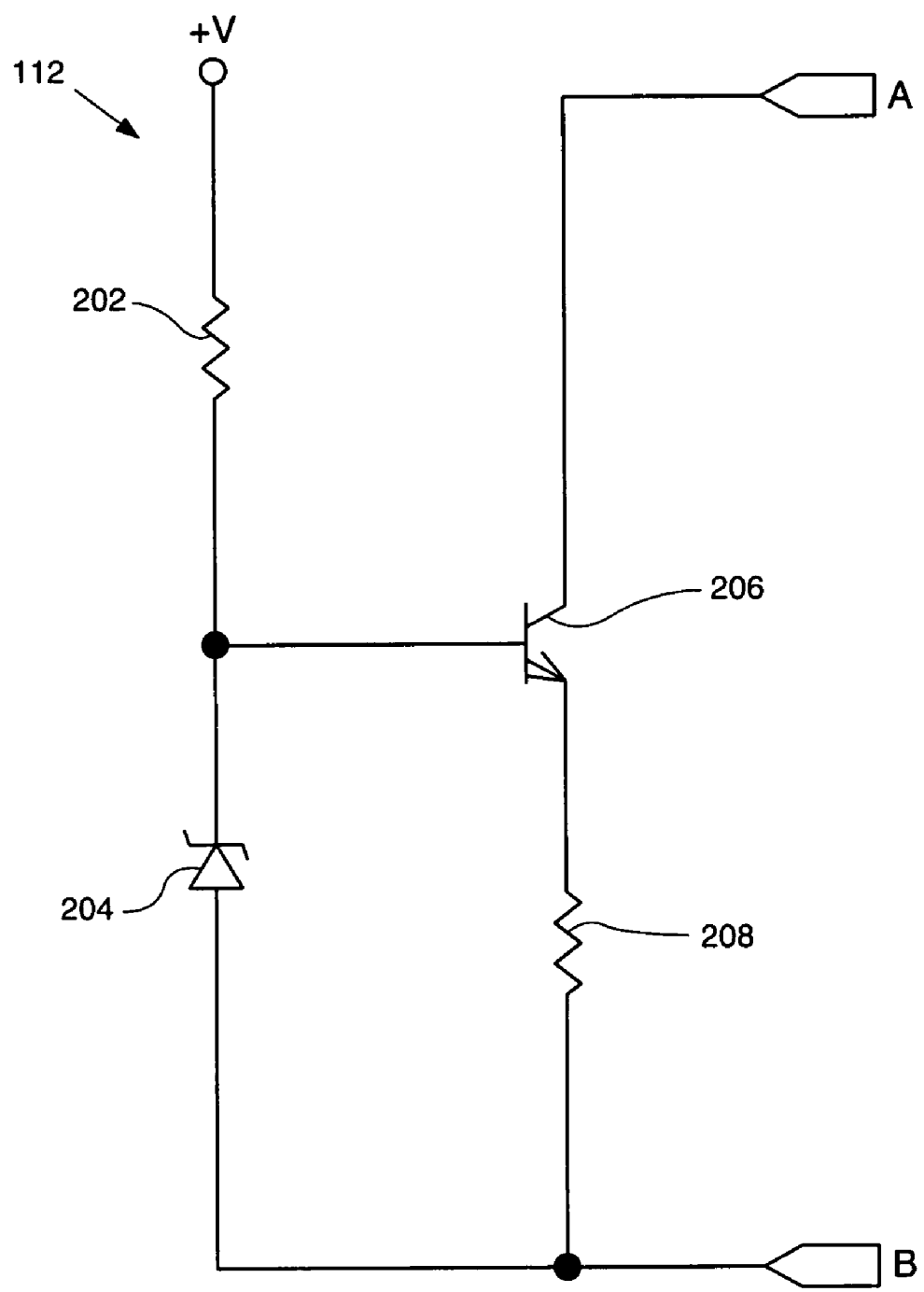
FIG. 2 is a circuit diagram illustrating an aspect of the block diagram of FIG. 1.

FIG. 2 illustrates a typical constant current circuit suited for use in the above-described signal transfer system 106. The constant current circuit shown is designated as the first constant current circuit 112, but a similar circuit may be used for the second constant current circuit 114 as well.

A zener diode 204, connected in series with a first resistor 202 from a voltage source +V to a terminal point B, sets up a reference voltage which determines a voltage across a second resistor 208, which in turn determines a current flow amount through a transistor 206. As shown in FIGS. 1 and 2, the terminals marked A and B indicate the path of current flow from the first capacitor 116 as the first capacitor 116 discharges, the discharge being enabled by actuation of the first constant current circuit 112 as +V is applied by the signal transfer enabler 122.

An example of application of the apparatus 100 for transferring a signal is depicted in FIG. 3. An engine 302 drivably engages a generator 304 by way of a mechanical couple 310. The engine 302 may be a prime mover located on a machine, such as a mobile machine. The generator 304 may be a high voltage generator used for electric drive of a ground engaging member, such as a wheel. The high voltage generated by the generator 304 may also be delivered to the first bus circuit 108.

Typical applications of this nature may result in lowering of the high voltage level as the speed of the engine 302, and thus the rotating speed of the generator 304, decreases. The signal transfer system 106 may be configured to monitor the voltage level by a level of charge on the first capacitor 116, and transfer this level, i.e., analog signal, by actuation of the opto-coupler 120, to the second capacitor 118. The resultant charge on the second capacitor 118 may be monitored by a processor 308 located in the second bus circuit 110. Should the processor 308 determine from the transferred signal that the voltage from the generator 304 is lower than a desired threshold, a voltage may be applied to a field coil 306, which in turn induces a voltage in the generator 304, thus increasing the generator voltage to a more desired level.

INDUSTRIAL APPLICABILITY

FIG. 4 is a flow diagram which describes a method of use of the signal transfer system 106.

In a first control block 402, the first capacitor 116 is charged with a signal voltage, e.g., a DC analog signal. As shown in the graph 502 of FIG. 5, the voltage on the first capacitor 116 is represented by a first plot 504. The voltage level from a time t=0 to a time t1 increases from 0 to V1 as the first capacitor 116 is charged. Typically, the charge time is rather slow, for example about 0.1 second. During the initial time indicated by the graph 502, it is assumed that the signal reset circuit 126 has already reset any charge on the second capacitor 118 to zero volts, as depicted by a second plot 506.

From time t1 to a time t2, the first capacitor 116 maintains a charge voltage V1, and the second capacitor 118 is still without charge, i.e., at zero volts. However, in a second control block 404, the signal transfer enabler 122 initiates the first constant current circuit 112 and activates the opto-coupler 120, and the first capacitor 116 discharges, as shown in the first plot 504 from time t2 to a time t3. Activation of the opto-coupler 120 initiates current flow in the second constant current circuit 114, which begins charging of the second capacitor 118. The second capacitor 118 then charges to a voltage V2, as shown in the second plot 506 from time t2 to time t3, and the analog signal is transferred from the first bus circuit 108 to the second bus circuit 110, as depicted in a third control block 406. Once discharge of the first capacitor 116 is complete, the opto-coupler 120 is deactivated, and charging of the second capacitor 118 stops.

In a fourth control block 408, the first and second capacitors 116,118 may be identical to each other. Furthermore, the first and second constant current circuits 112,114 may be designed so that the amount of current flow in each is the same. In this situation, the voltages V1 and V2 may be of equal value. However, it can be appreciated that the capacitor values may be strategically chosen to achieve proportional values of V1 and V2. For example, the second capacitor 118 may be chosen at a value relative to the first capacitor 116 such that voltage V2 may be twice the value of voltage V, thus achieving positive amplification of the transferred signal. In like manner, if the second capacitor 118 is selectively larger than the first capacitor 116, the voltage V2 may be one half the voltage V1, resulting in negative amplification of the transferred signal. Other voltage proportions may be selected as desired. In addition, the first and second constant current circuits 112,114 may be designed so that the currents may not be equal, but rather may be proportional to achieve the same amplification effect.

From time t3 to a time t4, the charge of the second capacitor 118 is held at V2. Referring to a fifth control block 410, the signal from the second capacitor 118 is provided to the second bus circuit 110, and the signal transfer is complete. Before another signal can be transferred however, the second capacitor 118 must be reset to a zero voltage. From time t4 to a time t5, the second plot 506 indicates a rapid, e.g., about 0.01 second, discharge of the second capacitor 118 from voltage V2 to zero volts. The second capacitor 118 is now ready to receive another signal.

Other aspects can be obtained from a study of the drawings, the disclosure, and the appended claims.

What is claimed is:

1. An apparatus for transferring a signal from a first bus circuit to a second bus circuit, comprising:

a first constant current circuit connected to the first bus circuit;

a first capacitor connected between the first bus circuit and the first constant current circuit;

a second constant current circuit connected to the second bus circuit;

a second capacitor connected between the second bus circuit and the second constant current circuit; and an opto-coupler connected between the first and second constant current circuits and providing signal transfer control from the first capacitor to the second capacitor.

2. An apparatus, as set forth in claim 1, wherein the first bus circuit is electrically isolated from the second bus circuit.

3. An apparatus, as set forth in claim 1, wherein the first bus circuit includes a signal to transfer to the second bus circuit.

4. An apparatus, as set forth in claim 3, wherein the signal is an analog signal.

5. An apparatus, as set forth in claim 4, wherein the analog signal is a DC voltage.

6. An apparatus, as set forth in claim 1, wherein the first bus circuit is a high voltage circuit, and the second bus circuit is a low voltage circuit.

7. An apparatus, as set forth in claim 6, wherein the high and low voltage circuits are DC voltage circuits.

8. An apparatus, as set forth in claim 1, wherein the first bus circuit includes a signal transfer enabler.

9. An apparatus, as set forth in claim 8, wherein the signal transfer enabler is a processor.

10. An apparatus, as set forth in claim 1, further including a signal reset circuit connected to the second capacitor.

11. An apparatus, as set forth in claim 10, wherein the signal reset circuit is a switch.

12. An apparatus, as set forth in claim 1, wherein the opto-coupler is a non-linear opto-coupler.

13. A method for transferring a signal from a first bus circuit to a second bus circuit, comprising the steps of:
charging a first capacitor connected to the first bus circuit with a signal voltage;
enabling a first constant current circuit, connected to the first capacitor, to discharge the first capacitor through the first constant current circuit;
activating an opto-coupler connected between the first and second bus circuits to initiate charging of a second capacitor connected to a second constant current circuit; and
charging the second capacitor at a rate proportional to a rate of discharge of the first capacitor.

14. A method, as set forth in claim 13, further including the step of deactivating the opto-coupler in response to the first capacitor being discharged, the step of deactivating the opto-coupler causing charging of the second capacitor to stop.

15. A method, as set forth in claim 13, wherein the steps of enabling a first constant current circuit and activating an opto-coupler are performed at the same time.

16. A method, as set forth in claim 13, further including the step of providing the signal, represented by the charge on the second capacitor, to the second bus circuit.

17. A method, as set forth in claim 13, wherein enabling a first constant current circuit includes the step of initiating discharge of the first capacitor through the first constant current circuit.

18. A method, as set forth in claim 13, further including the step of resetting a charge on the second capacitor to a zero voltage charge prior to charging the second capacitor by the transferred signal.

19. A method, as set forth in claim 13, wherein charging a second capacitor at a rate proportional to a rate of discharge of the first capacitor includes the step of charging the second capacitor at the same rate as the rate of discharge of the first capacitor.

20. A method, as set forth in claim 19, wherein charging the second capacitor at the same rate as the rate of discharge of the first capacitor includes the step of charging the second capacitor to the same voltage as the charged voltage of the first capacitor.

21. A method, as set forth in claim 19, wherein charging the second capacitor at the same rate as the rate of discharge of the first capacitor includes the step of charging the second capacitor to a voltage proportional to the charged voltage of the first capacitor.

* * * * *

UNITED STATES PATENT AND TRADEMARK OFFICE
CERTIFICATE OF CORRECTION

PATENT NO.        : 7,411,849 B2
APPLICATION NO.   : 11/346473
DATED             : August 12, 2008
INVENTOR(S)       : Arthur Wild It is certified that error appears in the above-identified patent and that said Letters Patent is hereby corrected as shown below:

Please correct the Specification as follows:
Column 4, line 33, delete "V," and insert -- V1, --.

Signed and Sealed this

Twenty-fourth Day of February, 2009

JOHN DOLL
*Acting Director of the United States Patent and Trademark Office*